United States Patent
Carlsson

(10) Patent No.: US 8,268,924 B2
(45) Date of Patent: Sep. 18, 2012

(54) POLYOLEFIN COMPOSITION COMPRISING CROSSLINKABLE POLYOLEFIN WITH SILANE GROUPS, SILANOL CONDENSATION CATALYST AND PIGMENT

(75) Inventor: Roger Carlsson, Säve (SE)

(73) Assignee: Borealis Technology Oy, Porvoo (FI)

( * ) Notice: Subject to any disclaimer, the term of this patent is extended or adjusted under 35 U.S.C. 154(b) by 280 days.

(21) Appl. No.: 12/743,581

(22) PCT Filed: Dec. 11, 2008

(86) PCT No.: PCT/EP2008/010556
§ 371 (c)(1),
(2), (4) Date: Jul. 12, 2010

(87) PCT Pub. No.: WO2009/080222
PCT Pub. Date: Jul. 2, 2009

(65) Prior Publication Data
US 2010/0286308 A1    Nov. 11, 2010

(30) Foreign Application Priority Data

Dec. 21, 2007  (EP) .................................. 07025036

(51) Int. Cl.
*C08L 23/08* (2006.01)
(52) U.S. Cl. ........ 524/544; 524/430; 524/431; 524/570; 524/588
(58) Field of Classification Search .......................... None
See application file for complete search history.

(56) References Cited

U.S. PATENT DOCUMENTS

| | | | |
|---|---|---|---|
| 3,646,155 A | 2/1972 | Scott | |
| 4,117,195 A | 9/1978 | Swarbrick et al. | |
| 4,153,765 A | 5/1979 | Tsai | |
| 4,297,310 A | 10/1981 | Akutsu et al. | |
| 4,351,876 A | 9/1982 | Doi et al. | |
| 4,397,981 A | 8/1983 | Doi et al. | |
| 4,413,066 A | 11/1983 | Isaka et al. | |
| 4,446,283 A | 5/1984 | Doi et al. | |
| 4,456,704 A | 6/1984 | Fukumura et al. | |
| 5,350,812 A * | 9/1994 | Sultan et al. | 525/477 |
| 5,393,823 A | 2/1995 | Konno et al. | |
| 6,005,055 A | 12/1999 | Dammert et al. | |
| 2003/0027897 A1* | 2/2003 | Mei et al. | 523/216 |
| 2007/0199729 A1* | 8/2007 | Siegel et al. | 174/73.1 |

FOREIGN PATENT DOCUMENTS

| | | |
|---|---|---|
| EP | 1 254 923 | 11/2002 |
| WO | WO 91/09075 | 6/1991 |
| WO | WO 95/17463 | 6/1995 |
| WO | WO 02/12354 | 2/2002 |
| WO | WO 02/12355 | 2/2002 |
| WO | WO 2005/003199 | 1/2005 |

OTHER PUBLICATIONS

International Search Report mailed Jun. 4, 2009 for International application No. PCT/EP2008/010556.
Written Opinion of the International Searching Authority mailed Jun. 4, 2009 for International application No. PCT/EP2008/010556.

* cited by examiner

*Primary Examiner* — Marc Zimmer
(74) *Attorney, Agent, or Firm* — Fay Sharpe LLP

(57) ABSTRACT

The present invention is directed to particular titanium dioxide containing compositions which allow the retention of a high crosslinking performance of a polyolefin composition comprising a crosslinkable polyolefin with hydrolysable silane groups, a Brönstedt acid silanol condensation catalyst and said titanium dioxide containing composition. The retention of the high crosslinking performance is shown by a difference in torque measured at 120° C. of 40 Nm or higher.

11 Claims, No Drawings

POLYOLEFIN COMPOSITION COMPRISING CROSSLINKABLE POLYOLEFIN WITH SILANE GROUPS, SILANOL CONDENSATION CATALYST AND PIGMENT

The present invention relates to a polyolefin composition comprising a crosslinkable polyolefin with hydrolysable silane groups, a silanol condensation catalyst, and a pigment, to an article, in particular a wire or cable, comprising such a composition, and to the use of such a composition for the production of an article.

It is known to cross-link polyolefins by means of additives as this improves the properties of the polyolefin such as mechanical strength and chemical heat resistance. Crosslinking may be performed by condensation of silanol groups contained in the polyolefin which can be obtained by hydrolysation of silane groups. A silane compound can be introduced as a cross-linkable group e.g. by grafting the silane compound onto a polyolefin, or by copolymerisation of olefin monomers and silane group containing monomers. Such techniques are known e.g. from U.S. Pat. No. 4,413,066, U.S. Pat. No. 4,297,310, U.S. Pat. No. 4,351,876, U.S. Pat. No. 4,397,981, U.S. Pat. No. 4,446,283 and U.S. Pat. No. 4,456,704.

For cross-linking of such polyolefins, a silanol condensation catalyst must be used. Conventional catalysts are for example tin-organic compounds such as dibutyl tin dilaurate (DBTDL). It is further known that the cross-linking process advantageously is carried out in the presence of acidic silanol condensation catalysts. In contrast to the conventional tin-organic catalysts the acidic catalysts allow cross-linking to quickly take place already at room temperature. Such acidic silanol condensation catalysts are disclosed for example in WO 95/17463. The content of this document is enclosed herein by reference.

It is also known to use various additives in polyolefin compositions. The particular type and amount of the additive to be used is dependent on the particular application a polyolefin composition is designed for.

An important group amongst such additives is represented by the pigments. One of the most important group of pigments comprises titanium dioxide, $TiO_2$, as the main component. Titanium dioxide is used in these pigments in order to improve the colour coverage of the processed article, the titanium dioxide makes the article more opaque.

Hence, the use of titanium dioxide containing compositions in polyolefin compositions comprising a polyolefin with hydrolysable silane groups and a conventional silanol condensation catalyst is known in the art.

However, it has now been shown that titanium dioxide containing compositions are deactivating the crosslinking ability of Brönstedt acids used as silanol condensation catalysts. Therefore, generally speaking, titanium dioxide containing compositions are not compatible with the technology of crosslinking polyolefins containing hydrolysable silane groups with a Brönstedt acid as a silanol condensation catalyst.

It is therefore an object of the present invention to provide a polyolefin composition comprising a crosslinkable polyolefin with hydrolysable silane groups, a Brönstedt acid silanol condensation catalyst and a titanium dioxide containing composition which does not negatively affect the crosslinking performance of the Brönstedt acid silanol condensation catalyst.

The crosslinking performance is measured in a batch mixer which measures and plots the torque at the rotors. The polyolefin containing hydrolysable silane groups is blended with the silanol condensation catalyst and the pigment composition at elevated temperature. After a homogenous melt has been formed the crosslinking is started and therefore the torque increases. The degree of crosslinking is given as the difference between the highest torque value, measured when the crosslinking is completed, and the lowest torque value, measured before the crosslinking starts.

It has now surprisingly been found that the above object can be achieved by applying particular selected titanium dioxide containing compositions according to the present invention.

The present invention provides a polyolefin composition comprising
(i) a crosslinkable polyolefin with hydrolysable silane groups (A),
(ii) a silanol condensation catalyst (B) which is a Brönstedt acid (B), and
(iii) a titanium dioxide containing composition (C),
characterized in that the difference between the highest torque value, when the crosslinking is completed, and the lowest torque value, before the crosslinking starts, both values measured at 120° C., is 40 Nm or higher.

Preferably the difference in torque measured at 120° C. is 44 Nm or higher, more preferably 45 Nm or higher, still more preferably 50 Nm or higher.

In case of an uncoated titanium dioxide or in case that the titanium dioxide containing composition does not comprise a coating containing silicon, the concentration of titanium dioxide in said titanium dioxide containing composition is preferably at least 93 wt %, more preferably at least 97 wt % and still more preferably at least 98 wt %.

In case the titanium dioxide in said titanium dioxide containing composition is coated, which coating contains silicon, the concentration of the titanium dioxide in said titanium dioxide containing composition is at least 97 wt %.

It is further preferred that the amount of a coating of the titanium dioxide of said titanium dioxide containing composition is at most 7 wt %, more preferably at most 3 wt % and still more preferred at most 1 wt %.

Preferably, the titanium dioxide in said titanium dioxide containing composition does not contain any coating.

The compositions according to the invention allow the retention of a high crosslinking performance of a polyolefin composition comprising a crosslinkable polyolefin with hydrolysable silane groups, a Brönstedt acid silanol condensation catalyst and a particular titanium dioxide containing composition.

Commercially available titanium dioxide containing compositions usually comprise a coating of the titanium dioxide. These coatings allow for a better dispersion of the pigment composition in the polyolefin composition. Still further, the coating affects the warping behaviour of a polyolefin composition. Without being bound to theory it is believed that the type and amount of coating affects also the compatibility of the respective titanium dioxide containing composition with the Brönstedt acid silanol condensation catalyst.

Preferably the titanium dioxide containing compositions according to the present invention contain coated titanium dioxide but nevertheless achieve the favourable effect of the present invention, namely allowing the retention of a high crosslinking performance of a polyolefin composition comprising a crosslinkable polyolefin with hydrolysable silane groups, a Brönstedt acid silanol condensation catalyst and a particular titanium dioxide containing composition. Such compositions are commercially available as Tioxide RFC5, Tioxide TR28, Kemira 300 and Kemira RD3.

Preferably the titanium dioxide containing compositions according to the present invention do not contain coated titanium dioxide. Particular preferred examples are uncoated anatase or rutil. Such compositions are commercially available as Kemira AN and Tioxide AHR.

It is preferred that the particle size of the titanium dioxide used is greater than 0.10 µm. Still further, it is preferred that the particle size is smaller than 0.35 µm Even more preferred is that the particle size is greater than 0.15 µm and smaller than 0.25 µm.

Where in the present invention the term "particle size" is used, it shall denote the particle size which is measured with geometric weight distribution (average) with standard deviation using a transmission electron microscopy (TEM) instrument.

Preferably, in the polyolefin composition according to the invention the titanium dioxide containing composition is present in an amount of 0.01 to 10 wt %, more preferably of 0.1 to 5 wt %, and most preferably of 0.5 to 2 wt %.

The Brönstedt acid silanol condensation catalyst (B) is preferably a sulphonic acid, more preferably any organic sulphonic acid. Still more preferably it is an organic sulphonic acid comprising 10 C-atoms or more, more preferably 12 C-atoms or more, and most preferably 14 C-atoms or more, the sulphonic acid further comprising at least one aromatic group which may e.g. be a benzene, naphthalene, phenantrene or anthracene group. In the organic sulphonic acid, one, two or more sulphonic acid groups may be present, and the sulphonic acid group(s) may either be attached to a non-aromatic, or preferably to an aromatic group, of the organic sulphonic acid.

Further preferred, the aromatic organic sulphonic acid comprises the structural element:

$$Ar(SO_3H)_x \quad (II)$$

with Ar being an aryl group which may be substituted or non-substituted, and x being at least 1.

The organic aromatic sulphonic acid silanol condensation catalyst may comprise the structural unit according to formula (II) one or several times, e.g. two or three times. For example, two structural units according to formula (II) may be linked to each other via a bridging group such as an alkylene group.

Preferably, Ar is a aryl group which is substituted with at least one $C_4$- to $C_{30}$-hydrocarbyl group, more preferably $C_4$- to $C_{30}$-alkyl group.

Aryl group Ar preferably is a phenyl group, a naphthalene group or an aromatic group comprising three fused rings such as phenantrene and anthracene.

Preferably, in formula (II) x is 1, 2 or 3, and more preferably x is 1 or 2.

Furthermore, preferably the compound used as organic aromatic sulphonic acid silanol condensation catalyst has from 10 to 200 C-atoms, more preferably from 14 to 100 C-atoms.

In one preferred embodiment, Ar is a hydrocarbyl substituted aryl group and the total compound containing 14 to 28 carbon atoms, and still further preferred, the Ar group is a hydrocarbyl substituted benzene or naphthalene ring, the hydrocarbyl radical or radicals containing 8 to 20 carbon atoms in the benzene case and 4 to 18 atoms in the naphthalene case.

It is further preferred that the hydrocarbyl radical is an alkyl substituent having 10 to 18 carbon atoms and still more preferred that the alkyl substituent contains 12 carbon atoms and is selected from dodecyl and tetrapropyl. Due to commercial availability it is most preferred that the aryl group is a benzene substituted group with an alkyl substituent containing 12 carbon atoms.

The currently most preferred compounds are dodecyl benzene sulphonic acid and tetrapropyl benzene sulphonic acid.

The silanol condensation catalyst may also be precursor of the Brönstedt acid compound, including all its preferred embodiments mentioned, i.e. a compound that is converted by hydrolysis to such a compound. Such a precursor is for example the acid anhydride of a sulphonic acid compound, or a sulphonic acid that has been provided with a hydrolysable protective group, as e.g. an acetyl group, which can be removed by hydrolysis.

In a second preferred embodiment, the Brönstedt acid catalyst is selected from those as described in EP 1 309 631 and EP 1 309 632, namely a) a compound selected from the group of
(i) an alkylated naphthalene monosulfonic acid substituted with 1 to 4 alkyl groups wherein each alkyl group is a linear or branched alkyl with 5 to 40 carbons with each alkyl group being the same or different and wherein the total number of carbons in the alkyl groups is in the range of 20 to 80 carbons;
(ii) an arylalkyl sulfonic acid wherein the aryl is phenyl or naphthyl and is substituted with 1 to 4 alkyl groups wherein each alkyl group is a linear or branched alkyl with 5 to 40 carbons with each alkyl group being the same or different and wherein the total number of carbons in the alkyl groups is in the range of 12 to 80;
(iii) a derivative of (i) or (ii) selected from the group consisting of an anhydride, an ester, an acetylate, an epoxy blocked ester and an amine salt thereof which is hydrolysable to the corresponding alkyl naphthalene monosulfonic acid or the arylalkyl sulfonic acid;
(iv) a metal salt of (i) or (ii) wherein the metal ion is selected from the group consisting of copper, aluminium, tin and zinc; and
b) a compound selected from the group of
(i) an alkylated aryl disulfonic acid selected from the group consisting of the structure (III):

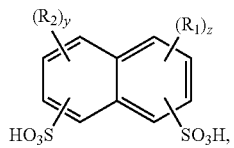

and the structure (IV):

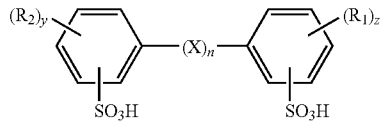

wherein each of $R_1$ and $R_2$ is the same or different and is a linear or branched alkyl group with 6 to 16 carbons, y is 0 to 3, z is 0 to 3 with the proviso that y+z is 1 to 4, n is 0 to 3, X is a divalent moiety selected from the group consisting of —C($R_3$)($R_4$)—, wherein each of $R_3$ and $R_4$ is H or independently a linear or branched alkyl group of 1 to 4 carbons and n is 1; —C(=O)—, wherein n is 1; —S—, wherein n is 1 to 3 and —S(O)$_2$—, wherein n is 1; and (ii) a derivative of (i) selected from the group consisting of the anhydrides, esters, epoxy blocked sulfonic acid esters, acetylates, and amine salts thereof which is a hydrolysable to the alkylated aryl disulfonic acid, together with all preferred embodiments of those sulphonic acids as described in the mentioned European Patents.

Preferably, in the polyolefin composition according to the invention the silanol condensation catalyst is present in an amount of 0.0001 to 6 wt %, more preferably of 0.001 to 2 wt %, and most preferably 0.02 to 0.5 wt %.

The composition of the present invention comprises a cross-linkable polyolefin containing hydrolysable silane groups (A). Preferably the cross-linkable polyolefin comprises, more preferably consists of, a polyethylene containing hydrolysable silane groups.

The hydrolysable silane groups may be introduced into the polyolefin by copolymerisation of e.g. ethylene monomers with silane group containing comonomers or by grafting, i.e. by chemical modification of the polymer by addition of silane groups mostly in a radical reaction. Both techniques are well known in the art.

Preferably, the silane group containing polyolefin has been obtained by copolymerisation. In the case of polyolefins, preferably polyethylene, the copolymerisation is preferably carried out with an unsaturated silane compound represented by the formula

$$R^1SiR^2_qY_{3-q} \quad (V)$$

wherein
$R^1$ is an ethylenically unsaturated hydrocarbyl, hydrocarbyloxy or (meth)acryloxy hydrocarbyl group,
$R^2$ is an aliphatic saturated hydrocarbyl group,
Y which may be the same or different, is a hydrolysable organic group and
q is 0, 1 or 2.

Special examples of the unsaturated silane compound are those wherein $R^1$ is vinyl, allyl, isopropenyl, butenyl, cyclohexanyl or gamma-(meth)acryloxy propyl; Y is methoxy, ethoxy, formyloxy, acetoxy, propionyloxy or an alkyl- or arylamino group; and $R^2$, if present, is a methyl, ethyl, propyl, decyl or phenyl group.

A preferred unsaturated silane compound is represented by the formula

$$CH_2=CHSi(OA)_3 \quad (VI)$$

wherein A is a hydrocarbyl group having 1-8 carbon atoms, preferably 1-4 carbon atoms.

The most preferred compounds are vinyl trimethoxysilane, vinyl bismethoxyethoxysilane, vinyl triethoxysilane, gamma-(meth)acryl-oxypropyltrimethoxysilane, gamma (meth)acryloxypropyltriethoxysilane, and vinyl triacetoxysilane.

The copolymerisation of the olefin, e.g. ethylene, and the unsaturated silane compound may be carried out under any suitable conditions resulting in the copolymerisation of the two monomers.

Moreover, the copolymerisation may be implemented in the presence of one or more other comonomers which can be copolymerised with the two monomers. Such comonomers include (a) vinyl carboxylate esters, such as vinyl acetate and vinyl pivalate, (b) alpha-olefins, such as propene, 1-butene, 1-hexane, 1-octene and 4-methyl-1-pentene, (c) (meth)acrylates, such as methyl(meth)acrylate, ethyl(meth)acrylate and butyl(meth)acrylate, (d) olefinically unsaturated carboxylic acids, such as (meth)acrylic acid, maleic acid and fumaric acid, (e) (meth)acrylic acid derivatives, such as (meth)acrylonitrile and (meth)acrylic amide, (f) vinyl ethers, such as vinyl methyl ether and vinyl phenyl ether, and (g) aromatic vinyl compounds, such as styrene and alpha-ethyl styrene.

Amongst these comonomers, vinyl esters of monocarboxylic acids having 1-4 carbon atoms, such as vinyl acetate, and (meth)acrylate of alcohols having 1-4 carbon atoms, such as methyl(meth)acrylate, are preferred.

Especially preferred comonomers are butyl acrylate, ethyl acrylate and methyl acrylate.

Two or more such olefinically unsaturated compounds may be used in combination. The term "(meth)acrylic acid" is intended to embrace both acrylic acid and methacrylic acid. The comonomer content of the copolymer may amount to 70 wt % of the copolymer, preferably about 0.5 to 35 wt %, most preferably about 1 to 30 wt %.

If using a graft polymer, this may have been produced e.g. by any of the two methods described in U.S. Pat. No. 3,646,155 and U.S. Pat. No. 4,117,195, respectively.

The silane group containing polyolefin (A) preferably contains 0.001 to 15 wt % of the silane compound, more preferably 0.01 to 5 wt %, most preferably 0.1 to 2 wt %.

The polymer composition according to the invention may further contain various additives, such as miscible thermoplastics, antioxidants, further stabilizers, lubricants, fillers, colouring agents and foaming agents.

As antioxidant, preferably a compound, or a mixture of such compounds, is used which is neutral or acidic, must comprise a sterically hindered phenol group or aliphatic sulphur groups. Such compounds are disclosed in EP 1 254 923 to be particularly suitable antioxidants for stabilisation of polyolefins containing hydrolysable silane groups which are crosslinked with a silanol condensation catalyst, in particular an acidic silanol condensation catalyst. Other preferred antioxidants are disclosed in WO 2005/003199 A1.

Preferably, the antioxidant is present in the composition in an amount of from 0.01 to 3 wt %, more preferably 0.05 to 2 wt %, and most preferably 0.08 to 1.5 wt %.

The silanol condensation catalyst (B) usually is added to the silane group containing polyolefin (A) by compounding the polymer with a so-called master batch, in which the catalyst, and optionally further additives are contained in a polymer, e.g. polyolefin, matrix in concentrated form.

Also the titanium dioxide containing composition (C) is usually added as a master batch, the so-called colour master batch.

The silanol condensation catalyst (B) and the titanium dioxide containing composition (C) are preferably added to the silane group containing polyolefin (A) during the manufacturing step of the finished article, e.g. cable extrusion. Commonly the compositions (B) and (C) are added in a master batch form to composition (A). These master batches are manufactured by compounding and contain the silanol condensation catalyst and/or the pigment composition in a polymer matrix in concentrated form. Preferably, component (B) and component (C) are added via separate master batches.

The matrix polymer is preferably a polyolefin, more preferably a polyethylene, which may be a homo- or copolymer of ethylene, e.g. low density polyethylene, or polyethylene-methyl-ethyl-butyl-acrylate copolymer containing 1 to 50 wt % of the acrylate, and mixtures thereof.

As stated, in a master batch the compounds to be added to the silane group containing polyolefin are contained in concentrated form, i.e. in a much higher amount than in the final composition.

The master batch preferably comprises component (B) in an amount of from 0.3 to 6 wt %, more preferably from 0.7 to 3.5 wt %.

Component (C) preferably is present in the master batch in an amount of from 0.5 to 95 wt %, more preferably from 2 to 50 wt %.

The master batch preferably is processed with the silane group containing polymer in an amount of from 1 to 10 wt %, more preferably from 2 to 8 wt %.

Compounding may be performed by any known compounding process, including extruding the final product with a screw extruder or a kneader.

The present invention furthermore relates to a process for producing an article comprising extrusion of a polyolefin composition according to any one of the above described embodiments at a temperature in the range of 140 to 280° C.

The invention also relates to an article, preferably a wire or cable, comprising a polyolefin composition according to any one of the above described embodiments.

Furthermore, the invention relates to the use of a polyolefin composition according to any one of the above described embodiments for the production of an article, in particular a wire or cable.

Still further, the invention relates to the use of a titanium dioxide containing composition (C) according to any one of the above described embodiments as a pigment which allows the retention of a high crosslinking performance of a polyolefin composition comprising a crosslinkable polyolefin with hydrolysable silane groups, a Brönstedt acid silanol condensation catalyst and said titanium dioxide containing composition.

Preferably the retention of the high crosslinking performance is shown by a difference in torque measured at 120° C. of 40 Nm or higher, preferably 44 Nm or higher, more preferably 45 Nm or higher, and still more preferably 50 Nm or higher.

The following examples serve to further illustrate the present invention.

EXAMPLES

1. Measurement Methods a) Crosslinking Performance

The method used for checking the compatibility of additives in polyolefin compositions comprising a crosslinkable polyolefin with hydrolysable silane groups and a Brönstedt acid as a silanol condensation catalyst is described as follows.

The test requires a laboratory batch mixer with a capacity to blend 25 to 500 g and having the option to measure the melt temperature and the momentum of the rotors. It is an advantage if these parameters can be plotted during the test. In the present case a Brabender mixer with rotors having a capacity of 287 cm$^3$ is used. The weights and volumes of the components are calculated to have 254 cm$^3$. The chamber temperature is set to 120° C. and it is checked that the temperature is stable. The polymer resin is charged into the chamber in portions. When the resin is melted, the additives which are not part of the catalyst masterbatch are added. These additives can be a pigment color masterbatch or fillers or TiO$_2$ (titanium dioxide containing composition) or any other additive that should be tested. After dispersion of the additives in the melt, the catalyst masterbatch is charged. The melt is further mixed until the torque baseline is stable. Then 20 g of crushed ice, made from deionised water and packed in a small polyethylene plastic bag, is added to the melt and the time, temperature and torque are recorded until the cure is completed or for a maximum time of 2 h.

The increase of the torque (momentum) is registered on the plotter. The speed and degree of crosslinking is calculated from the curve. The degree of crosslinking is determined as the delta between the lowest momentum and the peak momentum achieved, both values being measured at a temperature of 120° C., i.e. the difference between the highest torque value recorded (when the crosslinking is completed), and the lowest torque value, (before the crosslinking starts, i.e. the baseline when adding the ice), is calculated.

b) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. and may be determined at different loadings such as 2.16 kg (MFR$_2$) or 21.6 kg (MFR$_{21}$).

c) Comonomer Content

Comonomer content (wt %) was determined in a known manner based on Fourier transform infrared spectroscopy (FTIR) determination calibrated with $^{13}$C-NMR. The peak for the comonomer was compared to the peak of polyethylene (e.g. the peak for butyl acrylate at 3450 cm$^{-1}$ was compared to the peak of polyethylene at 2020 cm$^{-1}$ and the peak for silane at 945 cm$^{-1}$ was compared to the peak of polyethylene at 2665 cm$^{-1}$. The calibration with $^{13}$C-NMR is effected in a conventional manner which is well documented in the literature.

2. Compositions Produced a) Master Batches a matrix resin: an ethylene butylacrylate copolymer with 17 wt % butylacrylate, a density of 924 kg/m$^3$ and a MFR$_2$ of 47.0 g/10 min;

a silanol condensation catalyst: linear dodecylbenzene sulphonic acid (DDBSA);

a silicon group containing compound: hexadecyl trimethoxy silane (HDTMS), antioxidant: butylated reaction products of 4-methyl-phenol with dicyclopentadiene (Ralox LC, CAS-no. 68610-51-5); and 1,3,5-tri-methyl-2,4,6-tris-(3,5-di-tert. butyl-4-hydroxyphenyl)benzene (Irganox 1330™, CAS-no. 1709-70-2).

The components were used in the master batches in the amounts as indicated in Table 1 below. Compounding of the master batches was performed using a Brabender kneader (small chamber, 47 cm$^3$), and 3 mm thick plates were compression moulded at 180° C.

TABLE 1

|  | /wt % |
| --- | --- |
| Matrix resin | 88.5 |
| DDBSA | 1.5 |
| HDTMS | 4 |
| Antioxidants | 6 | b) Compositions

The master batch of Table 1 was processed in an amount of 5 wt % with 94 wt % of a silane group containing polyethylene having a density of 923 kg/m$^3$, a MFR$_2$ of 0.9 g/10 min and a silane copolymer content of 1.3 wt % in a Brabender kneader with 1 wt % of the respective TiO$_2$ powder (confer Table 2).

3. Crosslinking Performance of Different Compositions

Table 2 shows the different titanium dioxide containing compositions used. The third column gives the concentration of the titanium dioxide in the titanium dioxide containing composition. The forth column indicates with "+" or "−"

whether the titanium dioxide in the titanium dioxide containing compound used is coated or not, respectively. Similarly, the fifth column contains information about the presence of a silicon containing coating. Finally, the sixth column indicates the crosslinking performance by providing the difference in torque measured at the highest point after crosslinking is finished, and the lowest point before crosslinking is started, at 120° C.

TABLE 2

|  |  | TiO$_2$/ wt % | Coating | Silicon containing coating | Δ(torque)/ Nm |
| --- | --- | --- | --- | --- | --- |
| Example 1 | Kemira AN | 98 | − | − | 55 |
| Example 2 | Tioxide AHR | 98 | − | − | 55 |
| Example 3 | Tioxide RFC5 | 97 | + | + | 47 |
| Example 4 | Tioxide TR28 | 97 | + | − | 44 |
| Example 5 | Kemira 300 | 97 | + | − | 41 |
| Example 6 | Kemira RD3 | 93 | + | − | 41 |
| Example 7 | Kemira 405 | 96 | + | + | 34 |
| Example 8 | Kemira 660 | 93 | + | + | 32 |
| Example 9 | Kemira RDE2 | 88 | + | + | 27 |
| Example 10 | Tioxide RTC30 | 92 | + | + | 26 |
| Example 11 | Tioxide APP2 | 96 | + | + | 21 |

The higher Δ(torque) is, the better is the crosslinking. The presence of a coating and the type of the coating is decisive for the performance. A silicon containing coating is more sensitive than a coating which is free of silicon.

The invention claimed is:

1. A polyolefin composition comprising
   (i) a crosslinkable polyolefin with hydrolysable silane groups (A),
   (ii) a silanol condensation catalyst (B) which is a Brönstedt acid (B), and
   (iii) a titanium dioxide containing composition (C),
characterized in that the difference between the highest torque value, when the crosslinking is completed, and the lowest torque value, before the crosslinking starts, both values measured at 120° C., is 40 Nm or higher.

2. Polyolefin composition according to claim 1, wherein the difference in torque measured at 120° C. is 44 Nm or higher.

3. Polyolefin composition according to claim 1, wherein the difference in torque measured at 120° C. is 45 Nm or higher.

4. Polyolefin composition according to claim 1, characterized in that said titanium dioxide containing composition does not comprise a coating containing silicon and the concentration of the titanium dioxide in said titanium dioxide containing composition is at least 93 wt %.

5. Polyolefin composition according to claim 4, wherein the concentration of the titanium dioxide in said titanium dioxide containing composition is at least 97 wt %.

6. Polyolefin composition according to claim 1, wherein the titanium dioxide in said titanium dioxide containing composition (C) is not coated.

7. Polyolefin composition according to claim 1, characterized in that the titanium dioxide in said titanium dioxide containing composition is coated, which coating contains silicon, and the concentration of the titanium dioxide in said titanium dioxide containing composition is at least 97 wt %.

8. Polyolefin composition according to claim 1, wherein the crosslinkable polyolefin with hydrolysable silane groups (A) comprises a polyethylene with hydrolysable silane groups.

9. Article comprising the polyolefin composition according to claim 1.

10. Article according to claim 9, wherein the article is a wire or cable.

11. Polyolefin composition according to claim 4, wherein the titanium dioxide in said titanium dioxide containing composition (C) is not coated.

* * * * *